R. A. ROWLAND.
MACHINE FOR CUTTING ROUND TUBS OR BOWLS.
APPLICATION FILED NOV. 12, 1918.
1,314,019.
Patented Aug. 26, 1919.
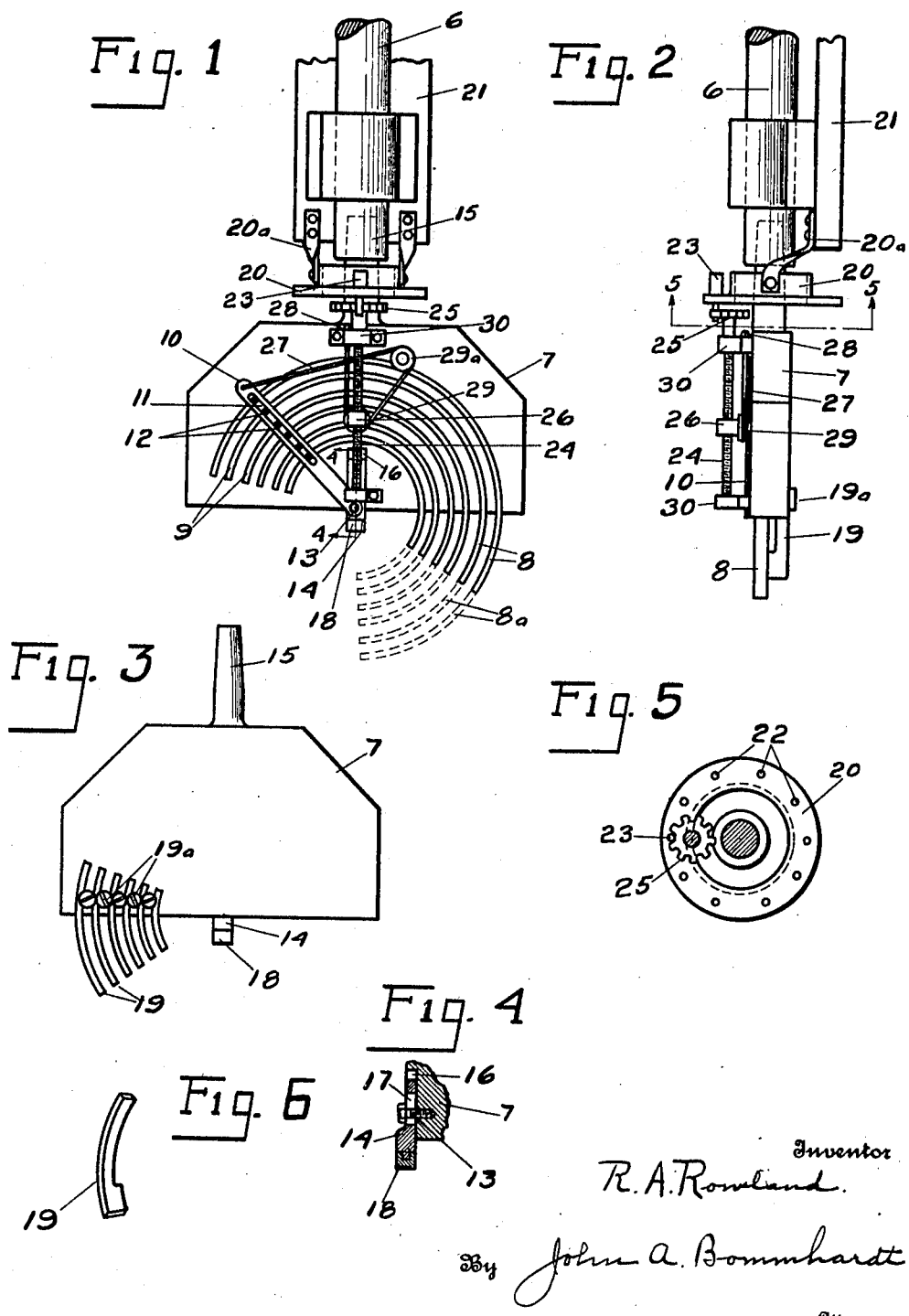

UNITED STATES PATENT OFFICE.

ROBERT A. ROWLAND, OF WESTVIEW, OHIO.

MACHINE FOR CUTTING ROUND TUBS OR BOWLS.

1,314,019.   Specification of Letters Patent.   Patented Aug. 26, 1919.

Application filed November 12, 1918. Serial No. 262,148.

*To all whom it may concern:*

Be it known that I, ROBERT A. ROWLAND, a citizen of the United States, residing at Westview, in the county of Cuyahoga and State of Ohio, have invented certain new and useful Improvements in Machines for Cutting Round Tubs or Bowls, of which the following is a specification.

This invention relates to a machine for cutting round tubs or bowls, particularly from stone or the like. It may be used for cutting out the hollows in laundry tubs, urns and similar hollow articles, or for cutting a plurality of semi-globular bowls or dishes, by the simultaneous use of a plurality of cutting tools.

I am aware that so-called "cylinder" saws have been used for cutting solid cores and producing cylindrical cavities in material of various kinds, but by the present invention a cavity is produced having a hemispherical surface, this surface being generated by the rotation of an arcuate cutting blade which is fed downwardly and inwardly, swinging on an axis intersecting the axis of rotation. By the use of a plurality of blades a plurality of bowl-shaped vessels or articles are simultaneously produced. Improved means are especially provided for holding and feeding the cutting blades. Although particularly intended for stone work, I apprehend that the blades may be toothed and used as saws for cutting cavities in wood or other material.

The machine is illustrated in the accompanying drawing in which Figure 1 is a front elevation thereof. Fig. 2 is a side elevation. Fig. 3 is a rear elevation of the head. Fig. 4 is a section on the line 4—4 of Fig. 1. Fig. 5 is a section on the line 5—5 of Fig. 2. Fig. 6 is a perspective detail of the heel.

In the drawings, 21 is a bracket which supports a rotary spindle 6 which is driven in any suitable way and which may be the spindle of a drill press or similar machine. 7 is a head which is relatively wide and flat and has a shank 15 at the upper edge which fits in the socket in the spindle 6 so that the spindle will rotate the head. This head has in one face thereof a plurality of semi-circular grooves 9 of proper depth and radius to receive the cutting blades 8 consisting of metal strips the lower or exposed ends 8ª of which constitute the cutting edges. The grooves 9 are of such depth that the plates 8 intersect the axis of rotation of the head. Each blade has at its inner end an offset lug 12 which engages in a slot 11 extending lengthwise in an arm 10. This arm is pivoted at 13 to the side of a center member or pin 14 which fits in a slot 16 lying in the axis of rotation of the head, where it is adjustably fastened by a screw extending through the slot 17. The pin 14 carries a cup-shaped point 18 which centers itself on the surface of the work during the operation and assists in supporting the tool. The rear edge of each blade 8 is supported by a heel or back plate member 19 fitting against the back of the head 7 where they are held by screws 19ª, and bear against the back edge of the blades to strengthen the same and prevent chattering. These heels 19 are curved on the same radius as the blades so that they can enter the kerfs made by the blades. They are not put in place until the blades 8 have cut part way into the material.

The blades are fed into the work by sliding the same lengthwise in the slot 9, thereby advancing them in curved lines, as indicated by dotted lines in Fig. 1. This feed is effected by suitable connections to the lever arm 10 as follows:

A disk 20 is fixed to the supporting member 21 of the machine, by brackets 20ª. This disk has a series of holes 22 arranged in a circle in the flange thereof, into which holes may be inserted any number of pins 23 which depend below the disk in position to engage the teeth of a pinion 25 fixed to the upper end of a screw 24 which is supported by brackets 30 on the face of the head 7. The feed screw is non-traveling and carries a nut 26 provided with a pulley 29. A cord 27 is fastened at 28 to the upper bracket 30 and extends around the pulley 29 and thence around a guide pulley 29ª on the head 7 and is connected to the free end of the arm 10. As the head rotates, the pinion 25 engages the pin 23 and is turned one tooth at each rotation. This turns the feed screw, and the nut 26 travels down on the screw and by the cord connection the arm 10 swings toward the vertical, thereby advancing the blade or blades 8 into the work. By increasing the number of pins 23 the feed is increased accordingly. If more pins are used, they will preferably be placed equal distances apart, to give a regular feed.

In operation, rotation of the tool 6 and the head 7 causes the cutting-edges 8ª of the blades to describe a circle on the work around the center 18, and as the blades are fed inwardly they cut out a hemisphere, completing the cut when the ends of the blades reach the axis of rotation. If several blades are used, a corresponding number of bowls or hollow hemispheres will be produced. The machine will produce a hemispherical cavity in a block of stone or other material much quicker and with much more precision than it can be produced by a hand tool.

I claim:

1. The combination of a rotary head, an arcuate blade carried thereby, having its cutting edge at one end, a lever pivoted on the head and connected to the other end of the blade and movable to feed the blade in the line of its curvature, a screw carried by the head, a traveling nut on the screw, connected to the lever to swing the same as the nut travels, and means to automatically turn the screw as the head is rotated.

2. The combination of a rotary shaft and head, a fixed disk through which the shaft extends, said disk having projecting pins, an arcuate cutter slidably carried by the head, a feed screw carried by the head and provided with a gear wheel engaging the pins to turn the screw as the shaft rotates, and connections between the screw and the cutter, to advance the latter by turning the screw.

In testimony whereof, I do affix my signature in presence of two witnesses.

ROBERT A. ROWLAND.

Witnesses:
JOHN A. BOMMHARDT,
G. H. ROSENBERG.

Copies of this patent may be obtained for five cents each, by addressing the "Commissioner of Patents, Washington, D. C."